United States Patent
Frederick et al.

(10) Patent No.: US 12,230,439 B2
(45) Date of Patent: Feb. 18, 2025

(54) INDUCTOR TUNING IN SUPERCONDUCTING CIRCUITS

(71) Applicant: Microsoft Technology Licensing, LLC, Redmond, WA (US)

(72) Inventors: Paige Frederick, Seattle, WA (US); Kenneth Reneris, Kirkland, WA (US); Matus Lipka, Kirkland, WA (US); Jason Lee, Savannah, GA (US); Jamie Kuesel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 965 days.

(21) Appl. No.: 17/246,497

(22) Filed: Apr. 30, 2021

(65) Prior Publication Data

US 2024/0282495 A1    Aug. 22, 2024

Related U.S. Application Data

(63) Continuation-in-part of application No. 17/235,798, filed on Apr. 20, 2021, now abandoned.

(51) Int. Cl.
*H01F 7/06* (2006.01)
(52) U.S. Cl.
CPC .................. *H01F 7/064* (2013.01)
(58) Field of Classification Search
USPC .......................................... 361/141
See application file for complete search history.

(56) References Cited

U.S. PATENT DOCUMENTS

| | | | | |
|---|---|---|---|---|
| 2009/0082209 A1* | 3/2009 | Bunyk | ................... | G06N 10/00 341/145 |
| 2018/0068779 A1* | 3/2018 | Wennerstrom | ...... | H01F 27/2823 |
| 2020/0258676 A1* | 8/2020 | MacLennan | .......... | H01F 27/085 |

FOREIGN PATENT DOCUMENTS

| CN | 111695275 A | * | 9/2020 | ............. G06F 30/23 |
|---|---|---|---|---|
| GB | 2570989 A | | 8/2019 | |

OTHER PUBLICATIONS

"Non Final Office Action Issued in U.S. Appl. No. 17/235,798", Mailed Date: May 12, 2022, 9 Pages.
Collot, et al., "Influence of External Magnetic Fields on the Inductive Properties of Rapid Single-Flux-Quantum Digital Circuits", In Proceedings of IEEE 14th International Superconductive Electronics Conference (ISEC), Jul. 7, 2013, 3 Pages.

(Continued)

*Primary Examiner* — Mohammed Alam
(74) *Attorney, Agent, or Firm* — Ranjeev Singh; Singh Law, PLLC

(57) ABSTRACT

Embodiments of the present disclosure provide systems and methods to determine an inductance for each of a plurality of inductors of a superconducting circuit. The plurality of inductors are routed between a plurality of superconducting devices. An amount of coupled flux between inductors of the plurality of inductors is determined. Inductor widths along portions of the plurality of inductors are adjusted based on the inductance, the amount of coupled flux, and inductance requirements of the superconducting devices.

20 Claims, 6 Drawing Sheets

(56) References Cited

OTHER PUBLICATIONS

Fourie, et al., "Experimentally Verified Inductance Extraction and Parameter Study for Superconductive Integrated Circuit Wires Crossing Ground Plane Holes", In Journal of Superconductor Science and Technology, vol. 26, Issue 1, Nov. 30, 2012, 12 Pages.
Lisenfeld, Jurgen, "Experiments on Superconducting Josephson Phase Quantum Bits", In Dissertation Submitted to University of Erlangen-Nuremberg, Dec. 19, 2007, 128 Pages.
Passos, et al., "Fully Analytical Characterization of the Series Inductance of Tapered Integrated Inductors", In International Journal of Electronics and Telecommunications, vol. 60, Issue 1, Mar. 1, 2014, pp. 73-79.
"International Search Report & Written Opinion issued in PCT Application No. PCT/US22/023188", Mailed Date : Jul. 20, 2022, 17 Pages.
Shen, et al., "Improving the Quality Factor of an RF Spiral Inductor with Non-Uniform Metal Width and Non-Uniform Coil Spacing", In Journal of Semiconductors, vol. 32, Issue 6, Jun. 1, 2011, 6 Pages.

\* cited by examiner

INDUCTOR TUNING IN SUPERCONDUCTING CIRCUITS

REFERENCE TO RELATED APPLICATION

The present application claims the benefit of and is a continuation-in-part of U.S. application Ser. No. 17/235,798, filed Apr. 20, 2021 and titled "INDUCTOR TUNING IN SUPERCONDUCTING CIRCUITS," the entire contents of which are incorporated herein by reference in its entirety for all purposes.

BACKGROUND

The present disclosure relates to tuning of inductors in superconducting circuits and in particular to tuning inductors based on coupled flux.

Superconductivity refers to a property of certain materials (e.g., niobium alloys) that can achieve zero electrical resistance at a critical temperature such that an electric current may persist indefinitely. Superconducting circuits, such as Single Flux Quantum based circuits, are electronic circuits implemented using superconductive devices (e.g., Josephson junctions) and inductors (e.g., superconductive wiring).

Superconducting devices may be configured to propagate or not propagate quantum flux pulses based on a DC bias, an AC clock, and a signal. Such devices may be performant within an operating margin but may become overbiased or underbiased as a result of coupled flux sources (e.g., other inductors inductively coupling with directly coupled inductors). Accordingly, superconducting circuits may require that inductors meet a self-inductance within a target range and that a minimal amount of cross-coupling between inductors exists in order to operate properly.

Superconducting circuits may be specifically designed to meet such requirements using electronic design automation (EDA). EDA is a category of software tools for designing electronic systems such as integrated circuits and printed circuit boards. The tools work together so that chip designers can design and analyze complex interactions between billions of components, making EDA tools important for their design.

There is a need for improved tuning of inductors in superconducting circuits that lowers the amount of coupled flux from other sources while bringing the self-inductance of the wires closer to their target.

SUMMARY

Embodiments of the present disclosure provide a computer system comprising one or more processors and a non-transitory computer readable storage medium coupled to the one or more processors. The non-transitory computer readable storage medium has stored thereon program code executable by the one or more processors. The program code being executable to determine an inductance for each of a plurality of inductors of a superconducting circuit. The plurality of inductors being routed between a plurality of superconducting devices. The program code further executable to determine an amount of coupled flux between inductors of the plurality of inductors. The program code further executable to adjust widths along portions of plurality of inductors based on the inductance, the amount of coupled flux, and inductance requirements of the superconducting devices.

Another embodiment of the present disclosure provides a method for tuning a plurality of inductors of a superconducting circuit. The method comprises determining an inductance for each of a plurality of inductors of a superconducting circuit. The plurality of inductors being routed between a plurality of superconducting devices. The method further comprising determining an amount of coupled flux between inductors of the plurality of inductors. The method further comprising adjusting widths along portions of plurality of inductors based on the inductance, the amount of coupled flux, and inductance requirements of the superconducting devices.

Another embodiment of the present disclosure provides a superconducting circuit. The superconducting circuit comprises a plurality of superconducting devices and a plurality of inductors coupled to the plurality of super conducting devices. Each inductor of the plurality of inductors is routed between two of the plurality of superconducting devices and is configured to carry quantum flux pulses between the two superconducting devices. The plurality of inductors are routed across the superconducting circuit using a plurality of interconnected segments of superconducting wire. Each end of a segment is coupled to a circuit-via, a pin of a superconducting device, or another segment, at a corner for example. In the superconducting circuit, there are segments of superconducting wire that are positioned to receive an amount of coupled flux above a threshold from other segments of superconducting wire. These segments have a second portion of the segment positioned between a first portion and a third portion. The second portion has a second width that is less than a first width of the first portion and less than a third width of the third portion.

BRIEF DESCRIPTION OF THE DRAWINGS

Various embodiments of the present disclosure are illustrated by way of example and not limitation in the figures of the accompanying drawings.

DETAILED DESCRIPTION

Figure 1:
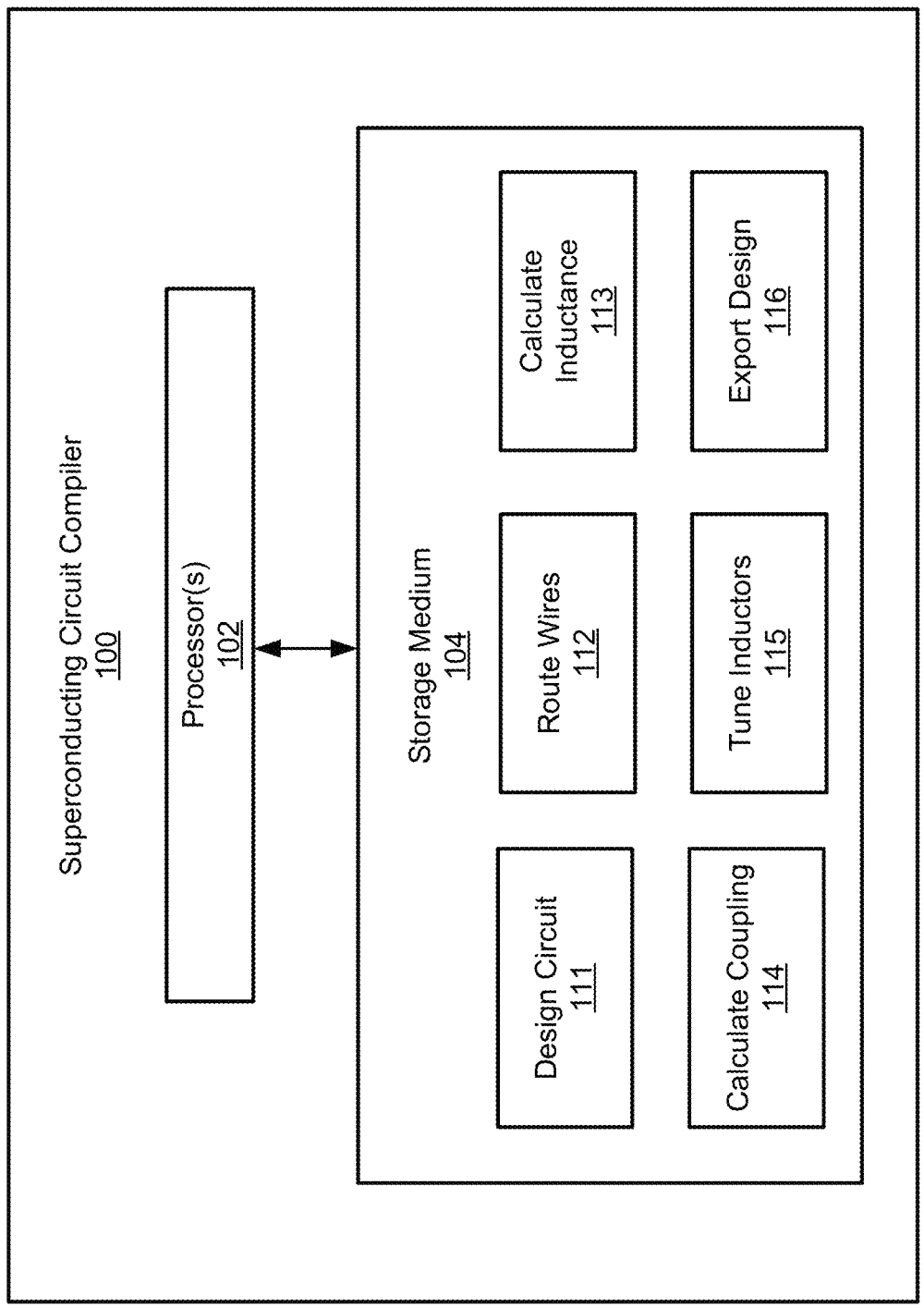
FIG. 1 shows a superconducting circuit compiler, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

As mentioned above, superconducting devices may be configured to propagate or not propagate quantum flux pulses based on a DC bias, an AC clock, and a signal. Such devices may be performant within an operating margin but may become overbiased or underbiased by coupled flux sources (e.g., other inductors inductively coupling with directly coupled inductors). Accordingly, superconducting circuits may require that their inductors have a self-inductance within a target range and a minimal amount of cross-coupling between inductors in order to operate properly.

Successful design of functioning and performant superconducting circuits may require that certain target properties to be met, including self-inductance (e.g., change in voltage due to change in current), maximum operating margins, and minimal coupling effects (e.g., change in inductor's current affects voltage of another inductor).

Described herein are techniques for improved tuning of inductors in a superconducting circuit that lowers the amount of coupled flux from other sources while bringing the self-inductance of the wires closer to their target.

As further described below, after the inductors are routed along the circuit, the inductance of a given inductor is computed based on the geometry of the wire (e.g., thicker wires have less inductance) and then the difference between the computed inductance and the target inductance is computed. Tuning involves adjusting wire thickness to minimize the delta (different) between the computed and the target inductance. This is achieved by incrementally tuning segments or portions of segments of the inductor (e.g., adjusting the width). An edge of a segment may also be adjusted to further minimize the delta in some cases. In addition, cross coupling present for a particular inductor is computed after the wire routing and a list of the inductors is sorted by the highest presence of coupling. Fine tuning of the inductors may proceed according to this ranking. Furthermore, when the wires tuned, the adjustment of widths is not limited to the edge of the wire segment. Instead, the highest contiguous area of coupling across the wire is calculated and that portion of the wire may be adjusted. Because each wire is already tuned within its self-inductance, the coupling aware tuning may not significantly affect the amount of self-inductance. Thus, operating margins of the superconducting devices (e.g., Josephson junctions) may be maximized by minimizing cross coupling and by minimizing the delta from the target self-inductance of the inductor. Tuning techniques for achieving this are further described below.

FIG. 1 shows a superconducting circuit compiler 100, according to an embodiment. The superconducting circuit compiler ("compiler") 100 is a computer system for creating superconducting circuit hardware designs based on sets of instructions. The compiler 100 includes one or more processors 102 coupled to a storage medium 104, which stores program code executable by the processor to perform the operations and functions described below. The storage medium 104 may be a non-transitory computer readable storage medium that stores program code. The hardware of the compiler 100 computer system is further described below with respect to FIG. 6.

The compiler 100 is an example of computer system executing an electronic design automation (EDA) tool for designing electronic systems such as integrated circuits and printed circuit boards. The compiler 100 may be implemented by one or more computing systems (e.g., a system of one or more server computers) executing software program code to perform functions to Design Circuits 111, Route Wires 112, Calculate Inductance 113, Calculate Coupling 114, Tune Inductors 115, and Export Design 116. These functions may be used to design a circuit that may be manufactured. Discussion of the superconducting circuit and its components herein typically refers to the circuit as designed and simulated by the compiler 100, unless stated otherwise.

The Design Circuit 111 functionality may obtain sets of instructions defining functionality of the circuit. The compiler obtains these instructions and coverts them into hardware circuit design that when manufactured would achieve the intended operations and results of the instructions.

The Route Wires 112 functionality may be performed during or after the design of the other portions of the circuit. The wires may link the other circuit components to transmit signals or information. The routing of wires for superconductor circuits is different from routing wires for Complementary metal-oxide-semiconductor (CMOS). For instance, CMOS circuits typically find the shortest paths for routing wires. However, the shortest path technique may not work when routing superconducting wires because superconducting wires are inductors having an inductances based on the geometry of the wire. As such, superconducting wires may need to be routed in a path that is longer than the shortest path in order to meet a target self-inductance (e.g., an operating range of inductance values). A longer length of superconducting wire may have a higher self-inductance compared to a shorter length of superconducting wire. A wider (e.g., larger radius) superconducting wire may have a lower self-inductance compared to a narrower (e.g., smaller radius) super conducting wire. In some embodiments, the superconducting wires may be initially routed using a maximum width across the length of the wire. The maximum width may be set by a manufacturer of the circuit or it may be set by the compiler 100.

Each superconducting device (e.g., Josephson junction) may have more than one wire connected to it, each with potentially with different self-inductances. Furthermore, each of those wires may be inductively coupled to other inductors (referred to as "cross coupling" or "noise"). Thus, changes to the geometry of one wire may affect other wires. Given this, the Route Wires 112 functionality of the compiler 100 may rely on the Calculate Inductance 113 functionality and the Calculate Coupling 114 functionalities.

The Calculate Inductance 113 functionality may be configured to calculate the self-inductance of each wire based on its geometry as routed. The Calculation Inductance 113 functionality may account for changes to inductance resulting from the wires passing through a circuit-via (e.g., an electrical connection between layers in the circuit) as the superconducting wire may use such vias when changing direction. This may be the case in situations where the circuit is designed using layered directional tracks where tracks on a layer go in one direction and tracks in the layer above and below it go in a perpendicular direction.

The wiring between vias (or pins of superconducting devices) may be referred to as "segments" of wires. For example, a first superconducting device may be coupled to a second superconducting device using three segments of superconducting wire. The first segment may be connected to a pin of the first superconducting device and a first via, the second segment may be connected to the first via and a second via, and the third segment may be connected to the second via and a pin of the second superconducting device. The first segment and the second segment may be on different layers of the circuit. The second segment and the third segment may be on different layers of the circuit. The first segment and the third segment may be on the same or different layers of the circuit. The wire may change directions (e.g., 90°) each time it passes through a via since consecutive layers may have tracks in different directions.

Once the wires are routed, the inductance of the wires may be computed based on the wire's geometry. The Calculate Coupling 114 functionality may be configured to calculate an amount of the amount of flux coupled between two superconducting wire. The delta (difference) from the target inductance of the wire is then computed. Even if the inductor is already within the target inductance range for that wire, the delta from the target may be reduced by adjusting (tuning) the widths of various segments of the wire as further described below. Altering the width of individual wire segments (or partial segments) adjusts the self-inductance of the wire without altering is routed path.

As mentioned above, such cross coupling may cause superconducting devices (e.g., Josephson junctions) to become overbiased or underbiased outside of their operating margins, thereby causing malfunction. The Calculate Coupling 114 functionality may be further configured to calculate changes in coupling across the length of the wire. For instance, the Calculate Coupling 114 functionality may use a sliding window algorithm based on coupled flux along portions of the segments of the superconducting wire. The sliding window may be used to determine the portions of wire segments having the greater amount of coupling. That is, the portion of the wire segment to be adjusted (e.g., narrows) may be determined by computing the moving sum of how much coupling is seen on that portion of the wire. As further discussed below; segments having the greatest amount of coupling may be tuned (e.g., have their geometries adjusted) before segments having lower amounts of coupling.

Wire width is a contributing factor to the amount of flux coupled between two superconducting wires. Therefore, the coupling between two wires may be lowered by choosing particular portions along a given wire's path adjust the geometry of the wire (e.g., narrowing the wire). Coupling effects between wires may also impair the operating margins of the circuit and may lead to the failure of individual superconducting devices (e.g., Josephson junction) by over or under-biasing the superconducting device. Given this, a reduction in coupling effects may be needed in order to achieve the higher operating margins.

The Tune Inductors 115 functionality may be configured to adjust geometries of the superconducting wires, thereby adjusting their inductance, in order to meet the operating margins (e.g., inductance requirements) of the superconducting devices. For instance, a width of an inductor may be reduced (e.g., made thinner, or have a smaller radius) in order to increase an inductance of the inductor, unless doing so would exceed the target inductance of that inductor. The width of the inductor may also be increased, thereby reducing inductance. In some embodiments, there may be a discrete set of possible wire widths set by a manufacturer of superconducting circuits or by the compiler 100. That is, increases and reductions in widths may not be smooth or linear.

The Tune Inductors 115 functionality may be configured to perform coarse tuning of inductors based on calculated inductance by adjusting a width of the inductor (e.g., along an entire length of the inductor or along an entire length of a segment of the inductor), as further discussed below with respect to FIG. 2. The Tune Inductors 115 functionality may also be configured to perform fine tuning of inductors based on an amount of flux coupled with other inductors (e.g., cross coupling) by adjusting a width of a portion of the inductor (e.g., reducing a radius of a contiguous portion of a single segment of wire), as further described below with respect to FIG. 3.

The Tune Inductors functionality 115 may sort a list of the inductors by the amount of cross coupling present in the space each wire is routed. The coupling may be determined by the Calculate Coupling 114 functionality. Then the Tune Inductors 115 functionality may adjust the widths of the wires having the highest presence of coupling first while still considering the inductance requirements. After this, the starting point of the portion of wire to be adjusted is determined by calculating, using a sliding window algorithm, the highest contiguous area of coupling across the wire. Adjusting this specific portion of the wire is advantageous because it reduces the amount of cross coupling between wires while still meeting inductance requirements.

Typically, the Tune Inductors 115 functionality may be performed after the routing of the wires by the Route Wires 112 functionality. If the tuned wires are not meeting their target inductance, or if the superconducting devices are not within their operating margins, then the wires may be re-routed by the Route Wires functionality 112 and then re-tuned by the Tune Inductors 115 functionality until the design requirements are satisfied.

Features and advantages of such coupling-aware tuning is that it leads to better performance for the superconducting circuit by decreasing noise (e.g., coupled flux between wires) and reaching inductance targets (e.g., within a target range) to obtain increased operating margins.

Once the design of the superconducting circuit has been set such that the superconducting devices are within their operating margins and the inductors are within their target inductance range, the design may be exported to manufacturing. The Export Design 116 functionality is configured to format information for designing the circuit according to a manufacture's requirements. This information may be provided to the manufacturer and the circuit may be fabricated. By implementing the improved techniques for tuning inductors, such circuits may have higher operating margins and be less likely to malfunction.

Figure 2:
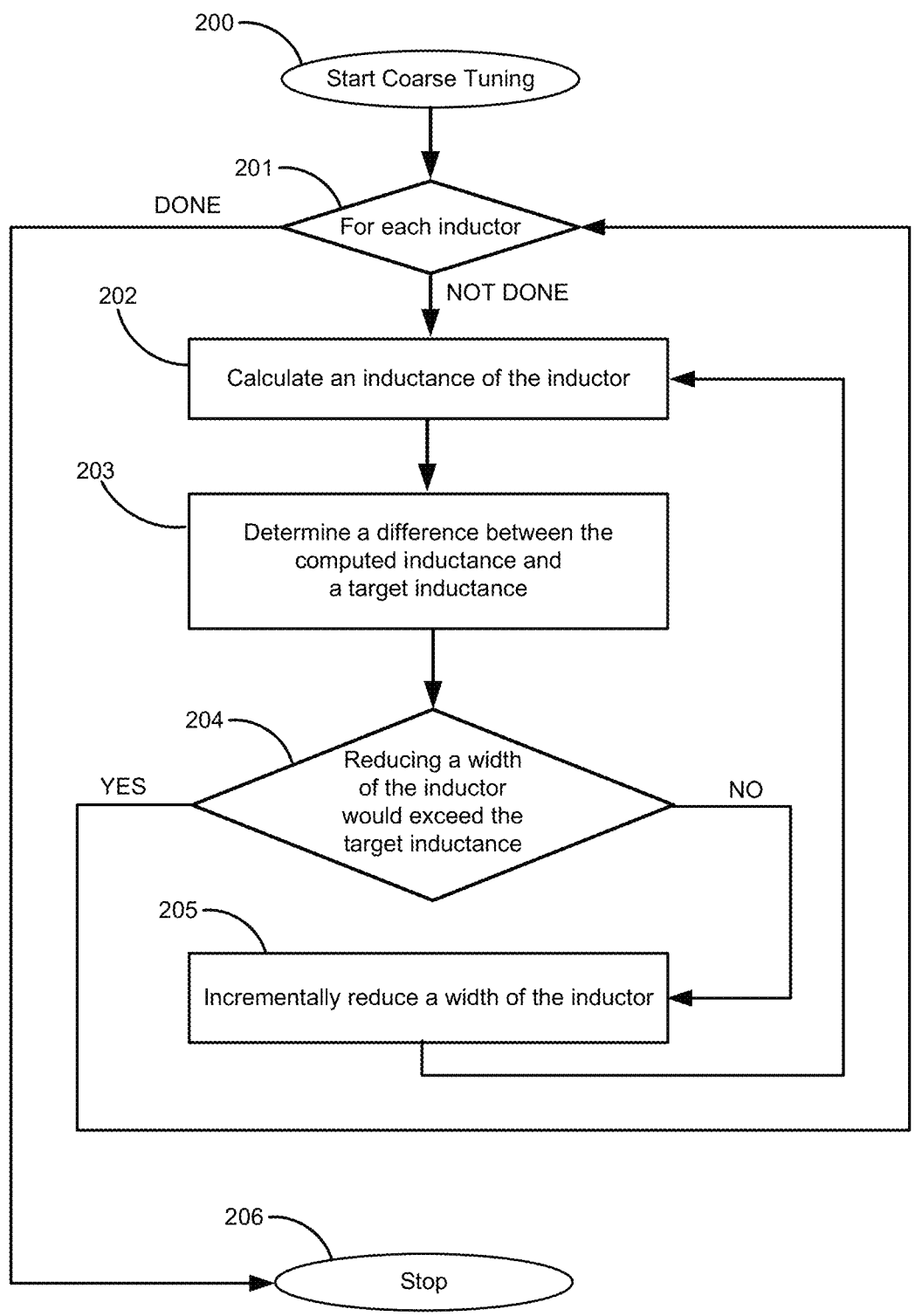
FIG. 2 shows a flowchart of a coarse tuning algorithm for tuning inductors of a superconducting circuit, according to an embodiment.

FIG. 2 shows a flowchart of a coarse tuning algorithm for tuning inductors of a superconducting circuit, according to an embodiment. The coarse tuning algorithm may be processed by Tune Inductors 115 functionality of the Superconducting Circuit Compiler 100 discussed above, for example. Coarse tuning may be performed after the superconducting wires are routed. In some embodiments, coarse tuning may be performed before fine tuning. In some embodiments, fine tuning may be performed before coarse tuning. In some embodiments, fine tuning and coarse tuning may be performed multiple times.

The coarse tuning algorithm starts at 200. The coarse tuning algorithm iterates, at 201, over each inductor to calculate its inductance and perform adjustments (e.g., tuning). That is, the algorithm performs a loop 201 ("For each inductor") that calculates, at 202, an inductance of the inductor. The inductance may be calculated based on its geometry as discussed above. Then at 203, the coarse tuning algorithm determines a difference between the computed inductance and a target inductance. The target inductance may be a range of values and the target inductance may be selected within that range (e.g., a maximum of the range, a minimum of the range, or a value therebetween).

After calculating the inductance for each inductor, the coarse tuning algorithm determines, at 204, whether reducing a width of the inductor would exceed the target inductance for that inductor. As discussed above, narrowing an inductor such that it has a smaller radius may increase the inductance. If the target inductance would not be exceeded, then the coarse tuning algorithm incrementally reduces, at 205, a width of the inductor. In some embodiments, the width of the inductor may be limited (e.g., by a manufacturer or by the compiler) to a set of discrete values. The incremental adjustments made at 205 may be made according to that set of discrete values, for example.

After reducing the width of the wire, the inductance of the adjusted wire is recalculated at 202 and further adjustments may be made unless the target inductance would be exceeded. If the target inductance would be exceeded, as determined at 204, the coarse tuning algorithm may iterate to the next inductor at 201 and begin the tuning process again for the next inductor until the loop at 201 is done adjusting each of the inductors ("DONE"). Then the coarse tuning algorithm stops, at 206.

Figure 3:
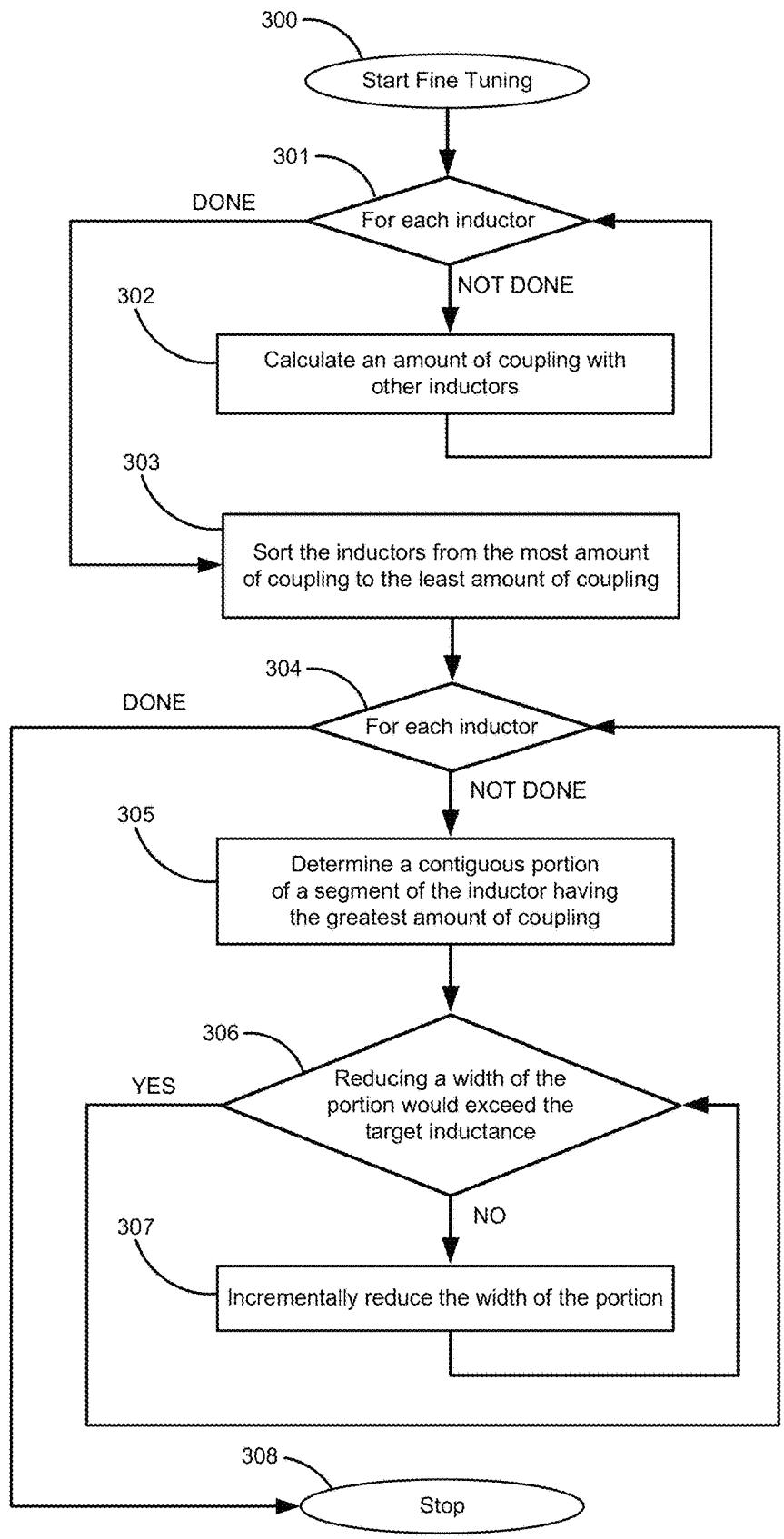
FIG. 3 shows a flowchart of a fine tuning algorithm for tuning inductors of a superconducting circuit based on an amount of coupled flux, according to an embodiment.

FIG. 3 shows a flowchart of a fine tuning algorithm for tuning inductors of a superconducting circuit based on an amount of coupled flux, according to an embodiment. The fine tuning algorithm 300 may be processed by Tune Inductors 115 functionality of the Superconducting Circuit Compiler 100 discussed above, for example. In some embodiments, coarse tuning may be performed before fine tuning. In some embodiments, fine tuning may be performed before coarse tuning. In some embodiments, fine tuning and coarse tuning may be performed multiple times.

The fine tuning algorithm starts at 300. The fine tuning algorithm iterates, at 301, over each inductor to calculate, at 302, an amount of cross coupling with other inductors and then performs adjustments (e.g., tuning). After the amounts of coupling have been calculated for each inductor, a list of the inductors is sorted, at 303, from the most amount of coupling to the least amount of coupling. In some embodiments the amount of coupling may be determined for each segment of the inductor instead of for the entire inductor and then the segments may be sorted.

The inductors (or segments of inductors) are then tuned beginning with the one having the greatest amount of cross coupling. To do this, the fine tuning algorithm iterates, at 304, over each inductor (or inductor segment) and determines, at 305 a contiguous portion of the inductor (or segment) having the greatest amount of coupling. This portion may be determined using a sliding window algorithm as discussed above.

After the portion having the greatest amount of coupling is determined, the fine tuning algorithm determines, at 306, whether reducing a width of the portion would exceed the target inductance of the inductor. If not (NO), then the inductor (or segment) is tuned by incrementally reducing, at 307, the width of that portion. The fine tuning algorithm stops at 308 once all portions have been tuned. In some embodiments the amount of cross coupling may be recalculated after each adjustment to a wire or segment has been made.

Figure 4:
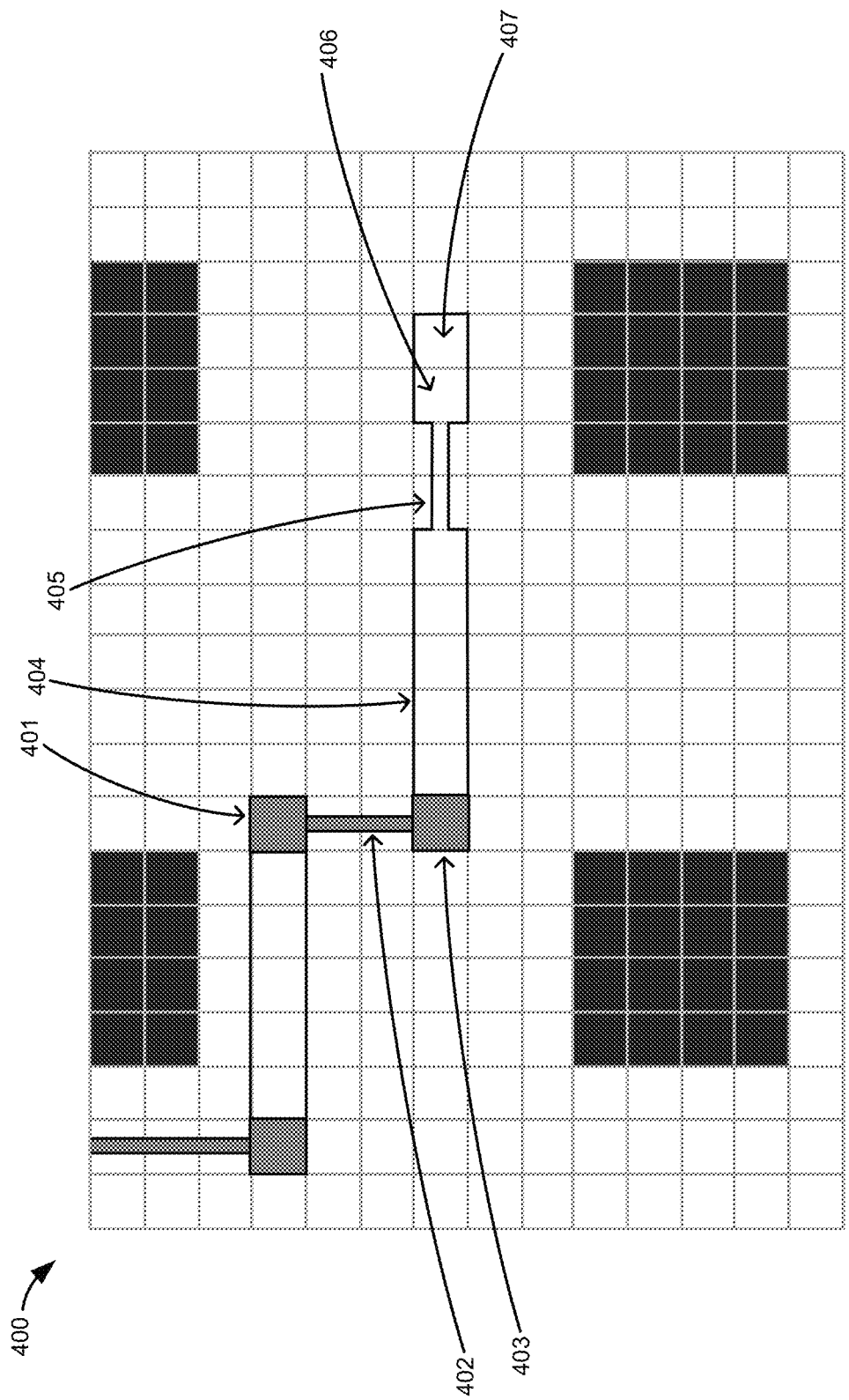
FIG. 4 shows an illustration of horizontal and vertical segments of an inductor having thinner portions to reduce coupled flux, according to an embodiment.

FIG. 4 shows an illustration 400 of horizontal and vertical segments of an inductor having thinner portions to reduce coupled flux, according to an embodiment. The illustration 400 may be provided in a user interface by a superconducting circuit compiler, such as the compiler 100 of FIG. 1.

This illustration shows multiple segments of an inductor routed across multiple layers using vias. The circuit and wires are positioned using a grid as shown. The gray coloring of the wires corresponds to one layer while the white coloring corresponds to another later. The black areas (squares) indicate portions of the circuit that may not contain wiring. The black areas may contain other components of the circuit.

In this embodiment, the inductor has been routed and then adjusted using the tuning techniques described above. As shown in FIG. 4, the inductor includes a wide portion 401, which may correspond to a circuit-via as the inductor may need to pass through a via in order to change directions. The wide portion 401 is followed by a narrow portion 402 (e.g., having a radius smaller than the radius of the wide portion 401), which is then followed by a wide portion 403 (e.g., having a radius larger than narrow portion 402). These portions 401, 402, 403 of superconducting wire may be referred to as a "segment" of an inductor. As used here, portions of superconducting wire positioned between two directly connected circuit-vias may be referred to as a "segment" of an inductor.

Another segment of the inductor includes the wide portion 403, another wide portion 404, a second narrow portion 405, another wide portion 406, and a final portion 407. In this segment, the narrow portion 405 is at a particular position within the segment. This position may have been determined using a sliding window based on the coupling effects as discussed above.

Thus, the inductors of a superconducting circuit may be tuned both coarsely and finely, enabling the target inductance to be reached while reducing cross coupling between inductors, thereby maximizing the operating margins of the superconducting devices (e.g., Josephson junctions).

Figure 5:
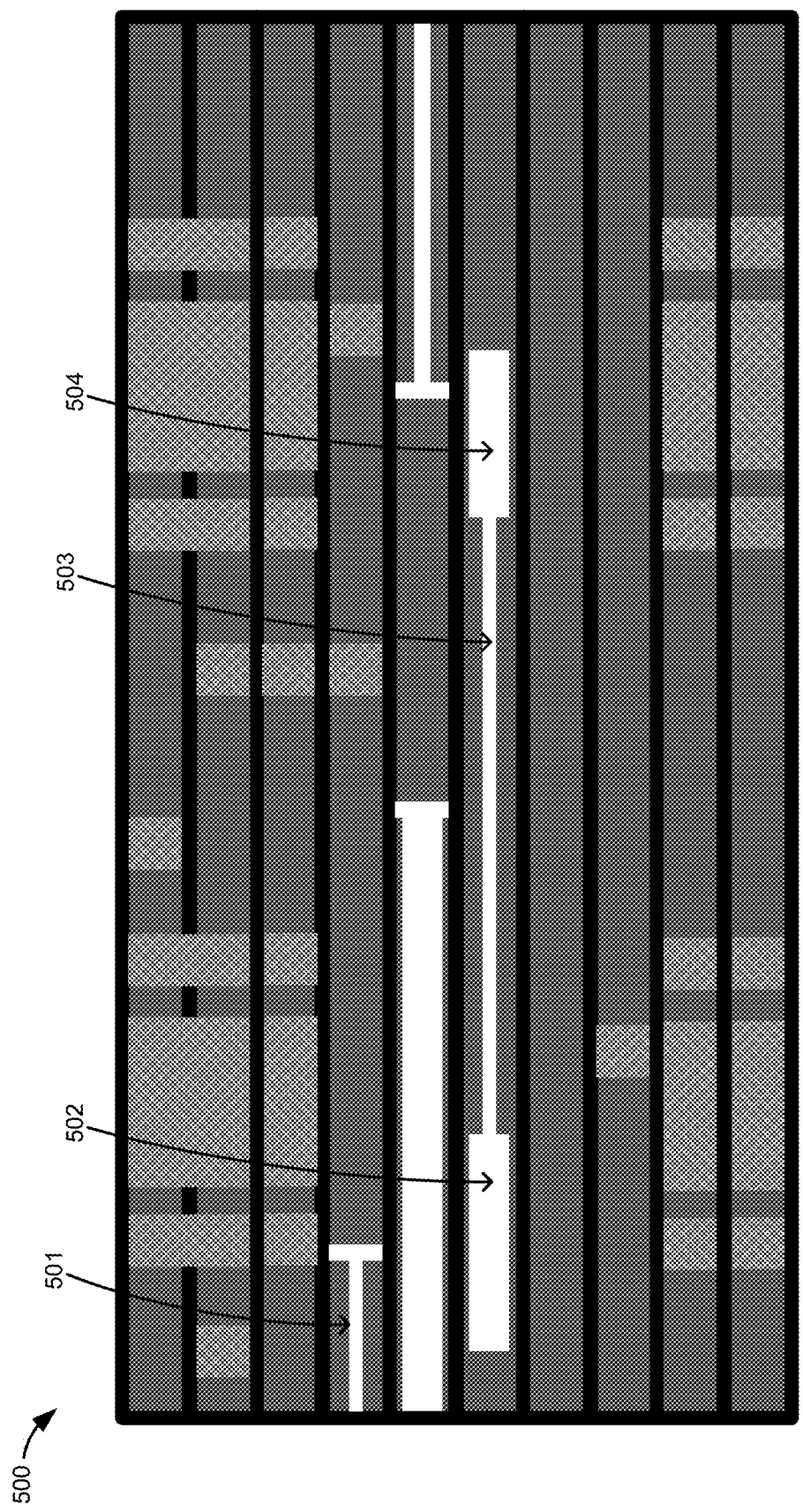
FIG. 5 shows an illustration of tracks including inductor segments having thinner portions to reduce coupled flux, according to an embodiment.

FIG. 5 shows an illustration 500 of tracks including inductor segments having thinner portions to reduce coupled flux, according to an embodiment. The illustration 500 may be provided in a user interface by a superconducting circuit compiler, such as the compiler 100 of FIG. 1.

This illustration 500 shows a single layer of a circuit having tracks. As mentioned above, superconducting wires may be routed along tracks in a single direction in some embodiments. In such embodiments, the wires may need to pass through circuit-vias in order to change directions. In this illustration 500, the wires are shown in white while the tracks are shown in dark gray with black lines therebetween. The lighter gray checkered areas indicate portions of the track where wires may not be routed. Other components of the circuit may be positioned in these areas.

In this embodiment, inductors have been routed and then adjusted using the tuning techniques described above. For example, the illustration 500 shows a first narrow portion 501 of a segment. The illustration 500 also shows a second segment having a wide section 502 followed by a narrow section 503, which is then followed by another wide section 504. The positioning of the narrow section 503 may have been determined using a sliding window based on an amount of coupled flux as discussed above.

As discussed above, reducing a width of portions of the wire segments may reduce cross coupling while also reducing a difference between a wire's inductance and its target self-inductance. This is advantageous because operating margins of the superconducting devices (e.g., Josephson junctions) may be maximized by minimizing cross coupling and by minimizing the delta from the target self-inductance of the inductor. Thus, a superconducting circuit tuned as shown would be more resilient to noise and less likely to malfunction.

Figure 6:
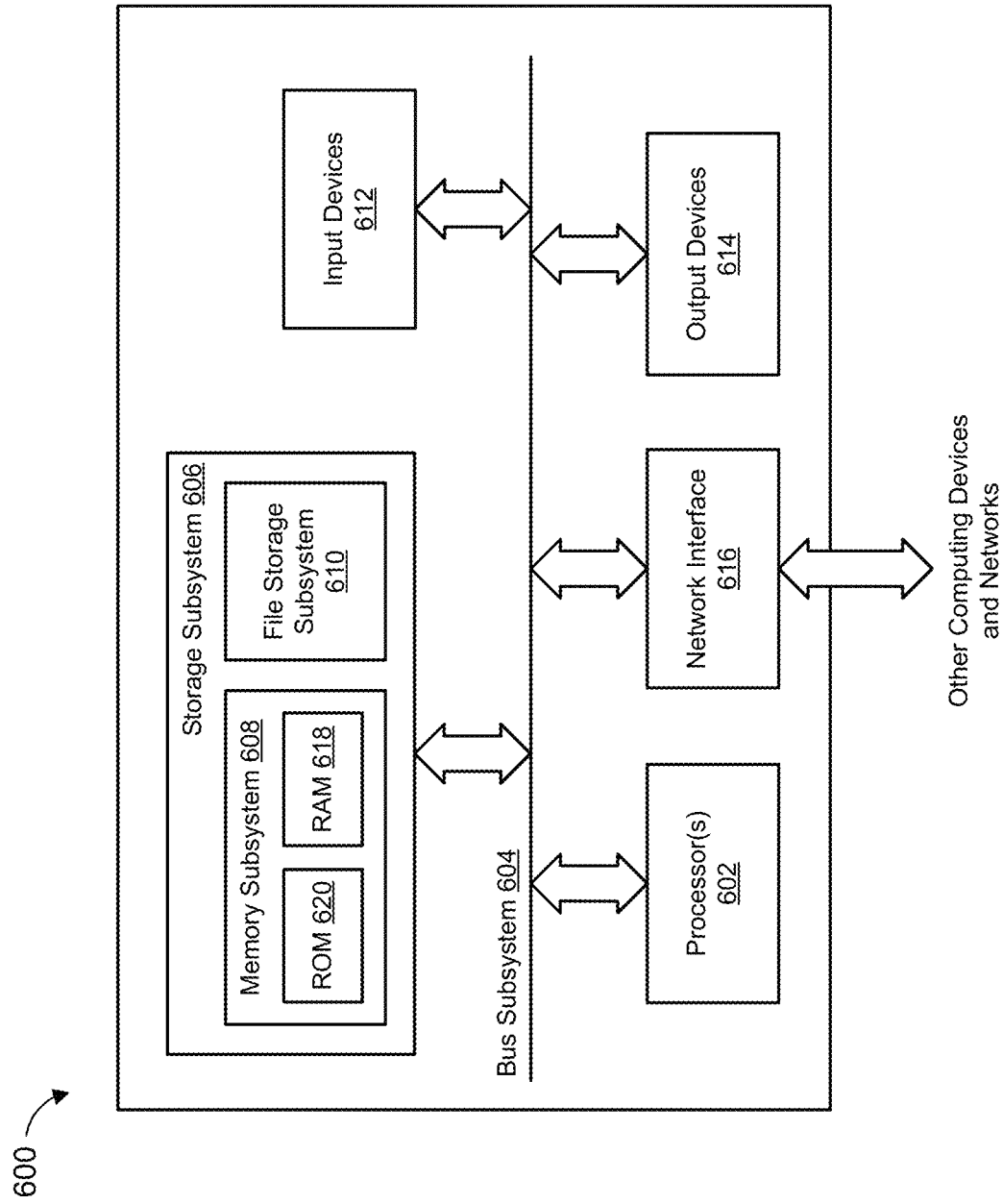
FIG. 6 is a block diagram of a computer system, according to an embodiment.

FIG. 6 is a block diagram 600 of a computer system, according to an embodiment. The computer system 600 includes one or more processors 602 that communicate with a number of peripheral devices via a bus subsystem 604.

These peripheral devices may include a storage subsystem 606 (e.g., comprising a memory subsystem 608 and a file storage subsystem 610) and a network interface subsystem 616. Some computer systems may further include user interface input devices 612 and/or user interface output devices 614.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple busses.

Network interface subsystem 616 can serve as an interface for communicating data between computer system 600 and other computer systems or networks. Embodiments of network interface subsystem 616 can include, e.g., Ethernet, a Wi-Fi and/or cellular adapter, a modem (telephone, satellite, cable, ISDN, etc.), digital subscriber line (DSL) units, and/or the like.

Storage subsystem 606 includes a memory subsystem 608 and a file/disk storage subsystem 610. Subsystems 608 and 610 as well as other memories described herein are examples of non-transitory computer-readable storage media that can store executable program code and/or data that provide the functionality of embodiments of the present disclosure.

Memory subsystem 608 includes a number of memories including a main random-access memory (RAM) 618 for storage of instructions and data during program execution and a read-only memory (ROM) 620 in which fixed instructions are stored. File storage subsystem 610 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art. It should be appreciated that computer system 600 is illustrative and many other configurations having more or fewer components than computer system 600 are possible.

The computer system 600 may implement the superconducting inductor tuning techniques described herein. For instance, the computer system 600 (e.g., the one or more processors 602) may execute Electronic Design Automation (EDA) program code, such as the superconducting circuit compiler 100 described above with respect to FIG. 1. The computer system 600 may also execute program code to perform the coarse tuning algorithm described above with respect to FIG. 2 and the fine tuning algorithm described above with respect to FIG. 3. The computer system also may execute program code to design superconducting circuits as described above with respect to FIG. 5 and FIG. 6. The program code or instructions for performing these functions may be stored in a non-transitory computer readable storage medium, such as the memory subsystem 608, the file storage subsystem 610, or different non-transitory computer readable storage medium that is separate from, but may be read by, the computer system 600.

Further Example Embodiments

Various additional embodiments of the present disclosure are described below.

One embodiment provides a computer system comprising one or more processors and a non-transitory computer readable storage medium coupled to the one or more processors. The non-transitory computer readable storage medium having stored thereon program code executable by the one or more processors to determine an inductance for each of a plurality of inductors of a superconducting circuit. The plurality of inductors routed between a plurality of superconducting devices. The program code further executable to determine an amount of coupled flux between inductors of the plurality of inductors. The program code further executable to adjust widths along portions of plurality of inductors based on the inductance, the amount of coupled flux, and inductance requirements of the superconducting devices.

In some embodiments of the computer system, the program code is further executable to determine differences between the determined inductance for each of the plurality of inductors and a target self-inductance. In such embodiments, the adjustment of widths is further based on the differences between the determined inductances and the target self-inductance.

In some embodiments of the computer system, the adjustment of widths along portions of the plurality of plurality of inductors comprises reducing widths of the portions.

In some embodiments of the computer system, widths of adjusted portions of an inductor are less than widths of preceding portions and following portions of the inductor.

In some embodiments of the computer system, the program code is further executable to sort a list of the plurality of inductors based on the amount of coupled flux. In such embodiments, the inductors having a greater amount of coupled flux are adjusted before inductors having a lesser amount of coupled flux.

In some embodiments of the computer system, the program code is further executable to determine positions of the portions of the plurality of inductors to be adjusted using a sliding window algorithm based on coupled flux.

In some embodiments of the computer system, the program code is further executable to route the plurality of inductors along the superconducting circuit using a predetermined maximum inductor width.

In some embodiments of the computer system, inductors having adjusted widths receive a reduced amount of coupled flux such that superconducting devices coupled thereto have an inductance within their operating margins.

In some embodiments of the computer system, the superconducting devices are Josephson junctions and the plurality of inductors are superconducting wires.

Another embodiment provides a method for tuning a plurality of inductors of a superconducting circuit. The method comprises determining an inductance for each of a plurality of inductors of a superconducting circuit. The plurality of inductors are routed between a plurality of superconducting devices. The method further comprises determining an amount of coupled flux between inductors of the plurality of inductors. The method further comprises adjusting widths along portions of plurality of inductors based on the inductance, the amount of coupled flux, and inductance requirements of the superconducting devices.

In some embodiments the method further comprises determining differences between the determined inductance for each of the plurality of inductors and a target self-inductance. In such embodiments, the adjustment of widths is further based on the differences between the determined inductances and the target self-inductance.

In some embodiments of the method, the adjustment of widths along portions of the plurality of plurality of inductors comprises reducing widths of the portions.

In some embodiments of the method, widths of adjusted portions of an inductor are less than widths of preceding portions and following portions of the inductor.

In some embodiments the method further comprises sorting a list of the plurality of inductors based on the amount of coupled flux. In such embodiments, the inductors having a greater amount of coupled flux are adjusted before inductors having a lesser amount of coupled flux.

In some embodiments the method further comprises determining positions of the portions of the plurality of inductors to be adjusted using a sliding window algorithm based on coupled flux.

In some embodiments the method further comprises routing the plurality of inductors along the superconducting circuit using a predetermined maximum inductor width.

In some embodiments of the method, inductors having adjusted widths receive a reduced amount of coupled flux such that superconducting devices coupled thereto have an inductance within their operating margins.

In some embodiments of the method, the superconducting devices are Josephson junctions, and wherein the plurality of inductors are superconducting wires.

Another embodiment provides a superconducting circuit comprising a plurality of superconducting devices and a plurality of inductors coupled to the plurality of super conducting devices. Each inductor of the plurality of inductors is routed between two of the plurality of superconducting devices and is configured to carry quantum flux pulses between the two superconducting devices. The plurality of inductors are routed across the superconducting circuit using a plurality of interconnected segments of superconducting wire where each end of a segment coupled to a circuit-via or a pin of a superconducting device. In the superconducting circuit, segments that are positioned to receive an amount of coupled flux above a threshold from other segments have a second portion positioned between a first portion and a third portion. The second portion has a second width that is less than a first width of the first portion and less than a third width of the third portion. That is, the second portion is a thinner portion compared to the first and second portions.

In some embodiments of the superconducting circuit, the segments having thinner portions receive a reduced amount of coupled flux such that superconducting devices coupled to the segments have an inductance within their operating margins.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system comprising:
   one or more processors; and
   a non-transitory computer readable storage medium coupled to the one or more processors and having stored thereon program code executable by the one or more processors to:
   determine an inductance for each of a plurality of inductors of a circuit, the plurality of inductors routed between Josephson junctions,
   determine an amount of coupled flux between inductors of the plurality of inductors, and
   adjust widths along portions of plurality of inductors based on the inductance, the amount of coupled flux, and inductance requirements of the Josephson junctions.

2. The computer system of claim 1, wherein the program code is further executable to:
   determine differences between the determined inductance for each of the plurality of inductors and a target self-inductance, wherein the adjustment of widths is further based on the differences between the determined inductances and the target self-inductance.

3. The computer system of claim 1, wherein the adjustment of widths along portions of the plurality of plurality of inductors comprises reducing widths of the portions.

4. The computer system of claim 3, wherein widths of adjusted portions of an inductor are less than widths of preceding portions and following portions of the inductor.

5. The computer system of claim 1, wherein the program code is further executable to:
   sort a list of the plurality of inductors based on the amount of coupled flux, wherein inductors having a greater amount of coupled flux are adjusted before inductors having a lesser amount of coupled flux.

6. The computer system of claim 1, wherein the program code is further executable to:
   determine positions of the portions of the plurality of inductors to be adjusted using a sliding window algorithm based on coupled flux.

7. The computer system of claim 1, wherein the program code is further executable to:
   route the plurality of inductors along the circuit using a predetermined maximum inductor width.

8. The computer system of claim 1, wherein inductors having adjusted widths receive a reduced amount of coupled flux such that Josephson junctions coupled thereto have an inductance within their operating margins.

9. The computer system of claim 1, wherein the plurality of inductors are superconducting wires.

10. A method for tuning a plurality of inductors of a circuit, comprising:
    determining an inductance for each of a plurality of inductors of a circuit, the plurality of inductors routed between Josephson junctions;
    determining an amount of coupled flux between inductors of the plurality of inductors;
    adjusting widths along portions of plurality of inductors based on the inductance, the amount of coupled flux, and inductance requirements of the Josephson junctions.

11. The method of claim 10, further comprising:
    determining differences between the determined inductance for each of the plurality of inductors and a target self-inductance, wherein the adjustment of widths is further based on the differences between the determined inductances and the target self-inductance.

12. The method of claim 10, wherein the adjustment of widths along portions of the plurality of plurality of inductors comprises reducing widths of the portions.

13. The method of claim 12, wherein widths of adjusted portions of an inductor are less than widths of preceding portions and following portions of the inductor.

14. The method of claim 10, further comprising: sorting a list of the plurality of inductors based on the amount of coupled flux, wherein inductors having a greater amount of coupled flux are adjusted before inductors having a lesser amount of coupled flux.

15. The method of claim 10, further comprising:
determining positions of the portions of the plurality of inductors to be adjusted using a sliding window algorithm based on coupled flux.

16. The method of claim 10, further comprising:
routing the plurality of inductors along the circuit using a predetermined maximum inductor width.

17. The method of claim 10, wherein inductors having adjusted widths receive a reduced amount of coupled flux such that Josephson junctions coupled thereto have an inductance within their operating margins.

18. The method of claim 10, wherein the plurality of inductors are superconducting wires.

19. A circuit, comprising:
a plurality of Josephson junctions; and
a plurality of inductors coupled to the plurality of Josephson junctions, each inductor of the plurality of inductors routed between two of the plurality of Josephson junctions and configured to carry quantum flux pulses between two Josephson junctions, the plurality of inductors routed across the circuit using a plurality of interconnected segments of superconducting wire, each end of a segment coupled to a circuit-via or a pin of a Josephson junction,
wherein segments that are positioned to receive an amount of coupled flux above a threshold from other segments have a second portion positioned between a first portion and a third portion, the second portion having a second width that is less than a first width of the first portion and less than a third width of the third portion.

20. The circuit of claim 19, wherein the segments having thinner portions receive a reduced amount of coupled flux such that Josephson junctions coupled to the segments have an inductance within their operating margins.

* * * * *